(12) United States Patent
You (10) Patent No.: US 11,787,113 B2
(45) Date of Patent: Oct. 17, 2023

(54) BIO PRINTER TO WHICH BIOMATERIAL FREEZE-HARDENING METHOD IS APPLIED AND FREEZE-HARDENING METHOD THEREOF

(71) Applicant: ROKIT HEALTHCARE INC., Seoul (KR)

(72) Inventor: Seok Hwan You, Seoul (KR)

(73) Assignee: ROKIT HEALTHCARE INC., Seoul (KR)

( * ) Notice: Subject to any disclaimer, the term of this patent is extended or adjusted under 35 U.S.C. 154(b) by 0 days.

(21) Appl. No.: 17/823,176

(22) Filed: Aug. 30, 2022

(65) Prior Publication Data
US 2023/0173754 A1 Jun. 8, 2023

(30) Foreign Application Priority Data
Dec. 3, 2021 (KR) .......................... 10-2021-0171689

(51) Int. Cl.
*B29C 64/245* (2017.01)
*B33Y 10/00* (2015.01)
(Continued)

(52) U.S. Cl.
CPC .......... *B29C 64/245* (2017.08); *B29C 64/106* (2017.08); *B29C 64/393* (2017.08);
(Continued)

(58) Field of Classification Search
None
See application file for complete search history.

(56) References Cited

U.S. PATENT DOCUMENTS

| 2017/0129169 A1* | 5/2017 | Batchelder | ............. B33Y 50/02 |
| 2017/0297111 A1* | 10/2017 | Myerberg | ............... B28B 1/001 |

(Continued)

FOREIGN PATENT DOCUMENTS

| KR | 101828345 B1 | 3/2018 |
| KR | 20190032960 A | 3/2019 |
| KR | 20210069391 A | 6/2021 |

OTHER PUBLICATIONS

Office Action issued in Korean Application No. 10-2021-0171689, dated Jan. 20, 2023 (6 Pages).

*Primary Examiner* — Yung-Sheng M Tsui
(74) *Attorney, Agent, or Firm* — Osha Bergman Watanabe & Burton LLP (57) ABSTRACT

The present disclosure relates to a bio printer to which a biomaterial freeze-hardening method is applied and a freeze-hardening method thereof. The bio printer may include: a plurality of dispensers configured to discharge a biomaterial inside a printing chamber; a printing plate module disposed below the dispensers so that the discharged biomaterial is placed thereon; a cooling module including one or more Peltier elements configured to cool the printing plate module, and a water block provided at a heating surface side of the Peltier elements and having a coolant flow path formed therein to circulate a coolant to dissipate heat generated from the Peltier elements; a coolant providing module configured to provide the coolant to the cooling module; a temperature sensor provided in the cooling module to calculate a temperature of a printing surface of the printing plate module; a printing controller configured to control the operation of the dispensers to print an output; and an output hardening controller configured to, upon completion of printing of the output by the printing controller, receive a detected value from the temperature sensor and control the cooling module (Continued)

and the coolant providing module to freeze-harden the output.

16 Claims, 12 Drawing Sheets

(51) Int. Cl.
    *B33Y 30/00*     (2015.01)
    *B33Y 50/02*     (2015.01)
    *B29C 64/393*     (2017.01)
    *B29C 64/106*     (2017.01)
    *B29K 67/00*     (2006.01)

(52) U.S. Cl.
    CPC ............... *B33Y 10/00* (2014.12); *B33Y 30/00* (2014.12); *B33Y 50/02* (2014.12); *B29K 2067/00* (2013.01); *B29K 2995/006* (2013.01); *B29K 2995/0056* (2013.01)

(56) References Cited

U.S. PATENT DOCUMENTS

| | | | |
|---|---|---|---|
| 2018/0200947 A1* | 7/2018 | Chen | B33Y 30/00 |
| 2019/0336649 A1* | 11/2019 | Béduer | B29C 35/16 |
| 2020/0164575 A1* | 5/2020 | Yu | B29C 64/209 |
| 2021/0179893 A1* | 6/2021 | Ogino | B29C 64/245 |
| 2022/0128581 A1* | 4/2022 | Martinez | B33Y 30/00 |

* cited by examiner

BIO PRINTER TO WHICH BIOMATERIAL FREEZE-HARDENING METHOD IS APPLIED AND FREEZE-HARDENING METHOD THEREOF

CROSS-REFERENCE TO RELATED APPLICATION

This application claims priority to and the benefit of Korean Patent Application No. 2021-0171689, filed on Dec. 3, 2021, the disclosure of which is incorporated herein by reference in its entirety.

BACKGROUND

1. Field of the Invention

The present disclosure relates to a bio printer to which a biomaterial freeze-hardening method is applied and a freeze-hardening method thereof that can freeze-harden a biomaterial, printed by the bio printer, on a printing surface to maintain a form of the biomaterial discharged.

2. Discussion of Related Art

In recent years, with an increase in the number of research fields in tissue engineering and regenerative medicine and demands for customized medical services, research on 3D printers using biomaterials has been actively carried out. A known 3D printer includes a frame constituting X-, Y-, and Z-axes and a nozzle for discharge of a biomaterial. In the conventional printer, a liquid dispenser is filled with a viscous fluid biomaterial such as collagen or gelatin. The fluid biomaterial with which the liquid dispenser is filled is discharged to a printing plate through a nozzle.

However, in a case in which the biomaterial is in a solid state instead of a fluid state, the nozzle should be heated to a high temperature to discharge the biomaterial in a flowable state. Therefore, in order to use a fluid biomaterial and a solid biomaterial together, a process of heating and cooling the nozzle is repeated, and thus the nozzle is overloaded.

In order to address this, Korean Patent Registration No. 10-1828345 discloses a 3D bio printer including a first dispenser configured to melt and discharge a solid biomaterial for forming a scaffold and other structures and a second dispenser configured to print a fluid biomaterial.

The above registered patent discloses a method of hybrid-laminating a solid biomaterial and a liquid biomaterial into a single structure. An example of the hybrid lamination includes a method in which a scaffold is formed on a printing surface using a biomaterial such as a polycaprolactone (PCL) biomaterial and then a liquid bio ink is printed to be filled in the scaffold.

However, the liquid bio ink has high fluidity, and thus the form of the liquid bio ink is easily changed. For a biomaterial to fulfill its own function in the living body, a form that fits a specific part of the living body should be created using the biomaterial, and then the form should be applied to the living body. When the form of the biomaterial discharged on the printing surface is easily changed, it is difficult to apply the biomaterial to the living body.

Therefore, there is a demand for a device that allows a biomaterial discharged from a fluid biomaterial dispenser, among dispensers of a bio printer, to be applied to the living body while the form of the biomaterial is maintained on the printing surface.

RELATED ART DOCUMENT

Patent Document (Patent Document 1) Korean Patent Registration No. 10-1828345 (Date of Publication: Mar. 29, 2018)

SUMMARY OF THE INVENTION

The present disclosure relates to a bio printer to which a biomaterial freeze-hardening method is applied and a freeze-hardening method thereof allowing a biomaterial discharged from a fluid biomaterial dispenser, among dispensers of the bio printer, to immediately harden on a printing surface and be applied to a living body while maintaining its form.

A first aspect of the present disclosure relates to a bio printer to which a biomaterial freeze-hardening method is applied. The bio printer may include: a plurality of dispensers configured to discharge a biomaterial inside a printing chamber; a printing plate module disposed below the dispensers so that the discharged biomaterial is placed thereon; a cooling module including one or more Peltier elements configured to cool the printing plate module, and a water block provided at a heating surface side of the Peltier elements and having a coolant flow path formed therein to circulate a coolant to dissipate heat generated from the Peltier elements; a coolant providing module configured to provide the coolant to the cooling module; a temperature sensor provided in the cooling module to calculate a temperature of a printing surface of the printing plate module; a printing controller configured to control the operation of the dispensers to print an output; and an output hardening controller configured to, upon completion of printing of the output by the printing controller, receive a detected value from the temperature sensor and control the cooling module and the coolant providing module to freeze-harden the output.

According to an embodiment of the present disclosure, the printing plate module may include a cooling bed which is disposed on the Peltier elements and cooled by the Peltier elements and a matrix plate which is detachably mounted on the cooling bed, wherein a biocompatible film having a surface on which the discharged biomaterial is placed may be detachably attached to an upper surface of the matrix plate due to viscosity.

According to an embodiment of the present disclosure, the plurality of dispensers may include a first dispenser which is configured to print a scaffold that defines an outer boundary of the output and a second dispenser which is configured to print a fluid biomaterial in the scaffold, wherein the scaffold may be fusion-fixed to the film as the film partially melts due to the biomaterial printed by the first dispenser, and the fluid biomaterial printed by the second dispenser may be designed not to leak through an interface between the scaffold and the film.

According to an embodiment of the present disclosure, the output formed of the scaffold and the fluid biomaterial and freeze-hardened may be a patch implanted in an affected area or a traumatic defect of a tissue or an organ of a mammal or a human being.

According to an embodiment of the present disclosure, the affected area may be an affected area where a diabetic foot ulcer or cartilage wear has occurred or a traumatic defect due to a burn or a cut has occurred.

According to an embodiment of the present disclosure, a first fixing surface and a second fixing surface which are configured to fix the mounted matrix plate may be disposed at positions facing each other on the cooling bed, and a handle extending to a position spaced apart from the cooling bed may be formed at the matrix plate.

According to an embodiment of the present disclosure, the second fixing surface may be formed in a direction toward a door of the printing chamber, and a fitting space into which the handle is fitted may be formed at the second fixing surface.

According to an embodiment of the present disclosure, a thermal grease layer may be formed between an upper surface of the Peltier elements and a lower surface of the cooling bed and between a lower surface of the Peltier elements and an upper surface of the water block.

According to an embodiment of the present disclosure, a Peltier support may be formed between the Peltier elements and the water block, and a plurality of grooves spaced apart from each other into which the Peltier elements are fitted may be formed in an upper surface of the Peltier support.

According to an embodiment of the present disclosure, the coolant providing module may include: a coolant tank configured to store a coolant and receive a circulating coolant from the water block; a coolant pump connected to the coolant tank; a radiator having one side connected to the coolant pump and the other side connected to the water block and having a coolant circulation flow path formed therein; and a radiator fan configured to dissipate heat generated from the radiator.

According to an embodiment of the present disclosure, a chamber outer space in which the coolant providing module is installed may be formed to be separated from an inner space of the printing chamber, and the chamber outer space may include: at least one duct fan configured to discharge heat generated in the chamber outer space to an outside of the bio printer; an outside air suction port through which outside air is introduced into the chamber outer space; and a coolant refill door formed to be openable and closeable to allow a coolant to be supplied from the outside to the coolant tank and formed above a coolant inlet of the coolant tank.

According to an embodiment of the present disclosure, the output hardening controller may operate the coolant pump, the radiator fan, and the duct fan while operating the Peltier elements, may stop the operation of the Peltier elements in response to the output being freeze-hardened due to a temperature of the printing surface being cooled to a predetermined temperature, and may, after stopping the operation of the Peltier elements, additionally operate the coolant pump, the radiator fan, and the duct fan for a predetermined amount of time in order to remove residual heat from the Peltier elements.

According to an embodiment of the present disclosure, the output hardening controller may control the operation of the Peltier elements so that the temperature of the printing surface reaches a predetermined temperature in a range of −1° C. to −20° C.

A second aspect of the present disclosure relates to a method of freeze-hardening a biomaterial of a bio printer. The method, which is a method of freeze-hardening a biomaterial of a bio printer including a plurality of dispensers, a printing plate module, a cooling module including a Peltier element, a temperature sensor provided in the cooling module, a coolant providing module including a coolant tank, a coolant pump, a radiator, and a radiator fan, a duct fan configured to discharge heat to the outside, a printing controller, and an output hardening controller, may include: (a) an operation of, by the printing controller, discharging a biomaterial in a printing chamber through the plurality of dispensers to form an output; (b) an operation of operating the coolant pump, the radiator fan, and the duct fan while operating the Peltier element; and (c) an operation of stopping the operation of the Peltier element in response to the output being freeze-hardened due to a temperature of a printing surface of the printing plate module, which is calculated on the basis of a value detected by the temperature sensor, being cooled to a predetermined temperature.

According to an embodiment of the present disclosure, the plurality of dispensers may include a first dispenser and a second dispenser, a biocompatible film may be detachably attached to an upper surface of the printing plate module due to viscosity, step (a) may include: (a-1) an operation of, by the first dispenser, printing a scaffold that defines an outer boundary of the output; (a-2) an operation of, by the second dispenser, printing a fluid biomaterial in the scaffold; and (a-3) an operation of fusion-fixing the scaffold to the film as the film partially melts due to the biomaterial printed by the first dispenser, wherein the fluid biomaterial printed by the second dispenser may be designed not to leak through an interface between the scaffold and the film.

According to an embodiment of the present disclosure, the method may further include, after (c), (d) an operation of, after stopping the operation of the Peltier element, additionally operating the coolant pump, the radiator fan, and the duct fan for a predetermined amount of time in order to remove residual heat from the Peltier element.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, details for carrying out the present disclosure will be described with reference to the accompanying drawings. In describing the present disclosure, when a related known function is apparent to those of ordinary skill in the art and is deemed as having the possibility of unnecessarily obscuring the gist of the present disclosure, detailed description thereof will be omitted.

Figure 1:
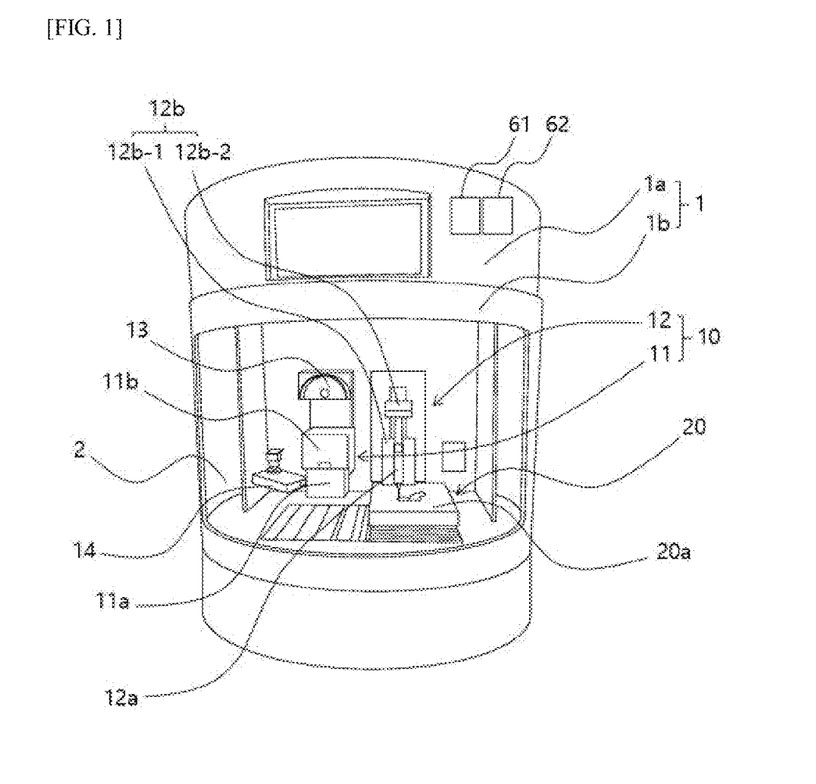
FIG. 1 is a view illustrating a bio printer to which a freeze-hardening method is applied according to the present disclosure.
Figure 2:
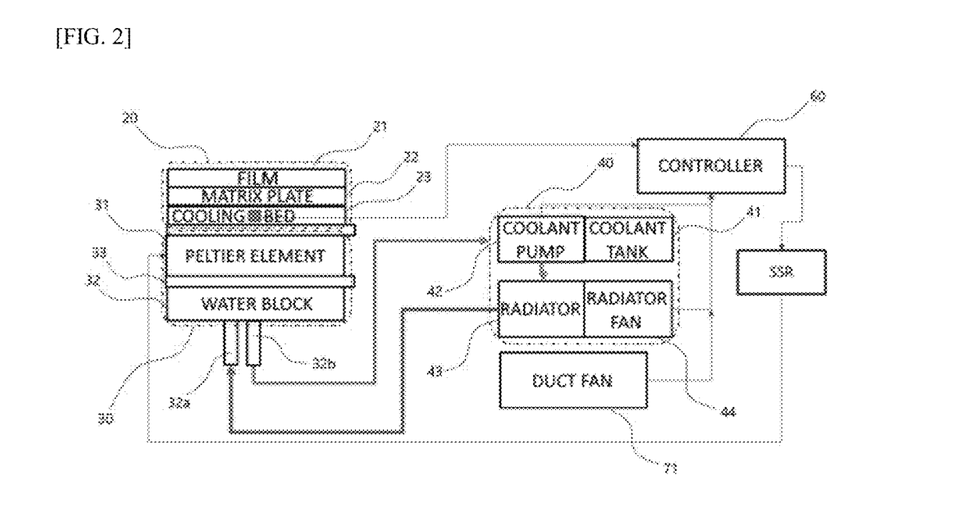
FIG. 2 is a block diagram illustrating each component for providing a coolant to a water block of FIG. 1.

FIG. 1 is a view illustrating a bio printer to which a freeze-hardening method is applied according to the present disclosure. FIG. 2 is a block diagram illustrating each component for providing a coolant to a water block of FIG. 1.

Referring to FIGS. 1 and 2, the bio printer to which a freeze-hardening method is applied according to the present disclosure includes a printing chamber 1 and a door 2 formed to be openable and closeable on the printing chamber 1 and performs printing of a biomaterial in an inner space closed by the door 2.

The bio printer includes a dispenser 10, a printing plate module 20, a cooling module 30, a coolant providing module 40, a temperature sensor 50, a printing controller 61, and an output hardening controller 62.

The dispenser 10 is provided as one or more dispensers 10 and is formed to discharge a biomaterial through a nozzle and be movable upward, downward, leftward, and rightward. The dispenser 10 may be made of a first discharge module and a second discharge module on which the first discharge module is detachably mounted. The dispenser 10 may be made of any one of a first dispenser 11 configured to melt and discharge a solid biomaterial and a second dispenser 12 configured to discharge a liquid bio ink.

A biomaterial holder 13 around which a biomaterial is wound is provided at an upper side of the first dispenser 11. The biomaterial may be made of a biomaterial to which a granular melting method using pneumatic pressure is applied or may be made of a polycaprolactone (PCL) biomaterial. The first dispenser 11 prints a scaffold that defines an outer boundary of an output. The biomaterial wound around the biomaterial holder 13 is provided to the first dispenser 11, heated to a predetermined temperature in the first dispenser 11, and then discharged through a nozzle. The first dispenser 11 is made of a 1-1 discharge module 11a and a 1-2 discharge module 11b. The nozzle is mounted on an end portion of the 1-1 discharge module 11a, and the 1-1 discharge module 11a is detachably mounted on the 1-2 discharge module 11b. A cooling fan 14 configured to cool down the biomaterial discharged from the first dispenser 11 may be disposed at a lateral portion of the nozzle of the first dispenser 11.

The second dispenser 12 discharges a liquid bio ink. The second dispenser 12 prints a fluid biomaterial in the scaffold discharged from the first dispenser 11. The second dispenser 12 is made of a 2-1 discharge module 12a and a 2-2 discharge module 12b. The 2-1 discharge module 12a is formed in the shape of a syringe and has a nozzle mounted on an end portion. The 2-2 discharge module 12b includes a fixer 12b-1 configured to fix the syringe, and a presser 12b-2 configured to receive power from a pneumatic pressure provider or a step motor (not illustrated) and press a pressure bar of the syringe to discharge the bio ink in the syringe.

Figure 3:
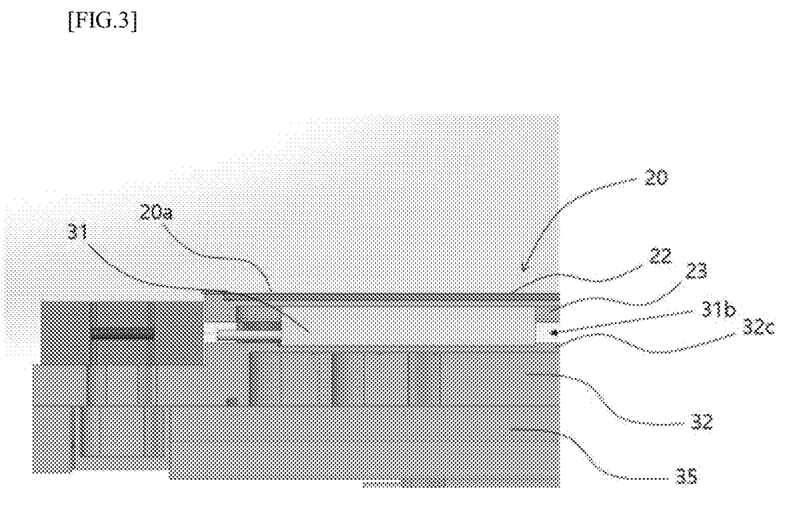
FIG. 3 is a lateral view illustrating each component of a printing plate module of FIG. 1.

FIG. 3 is a lateral view illustrating each component of a printing plate module of FIG. 1.

Referring to FIG. 3, the printing plate module 20 is disposed below the dispenser 10, has a printing surface 20a on which the discharged biomaterial is placed, and is formed to be fixed or formed to be movable on a horizontal plane.

The biomaterial discharged from the dispenser 10 is placed on the printing surface 20a. The printing plate module 20 may include, from top to bottom, a film 21, a matrix plate 22, and a cooling bed 23. The film 21 is detachably attached to an upper surface of the matrix plate 22, and in this case, an upper surface of the film 21 is the printing surface 20a. The film 21 may be made of a biocompatible material made of polyurethane. The matrix plate 22 is detachably mounted on the cooling bed 23. The film 21 is easily adhered to a molten polymer material and prevents the liquid bio ink from leaking from the scaffold. As the film 21 partially melts due to the biomaterial printed by the first dispenser 11, the scaffold is fusion-fixed to the film 21. Accordingly, the fluid biomaterial printed by the second dispenser 12 does not leak through an interface between the scaffold and the film 21. The output formed of the scaffold and the fluid biomaterial and freeze-hardened may be a configured as a patch implanted in an affected area or a traumatic defect of a tissue or an organ of a mammal or a human being. Also, the affected area may be an affected area where a diabetic foot ulcer or cartilage wear has occurred or a traumatic defect due to a burn or a cut has occurred.

Figure 4:
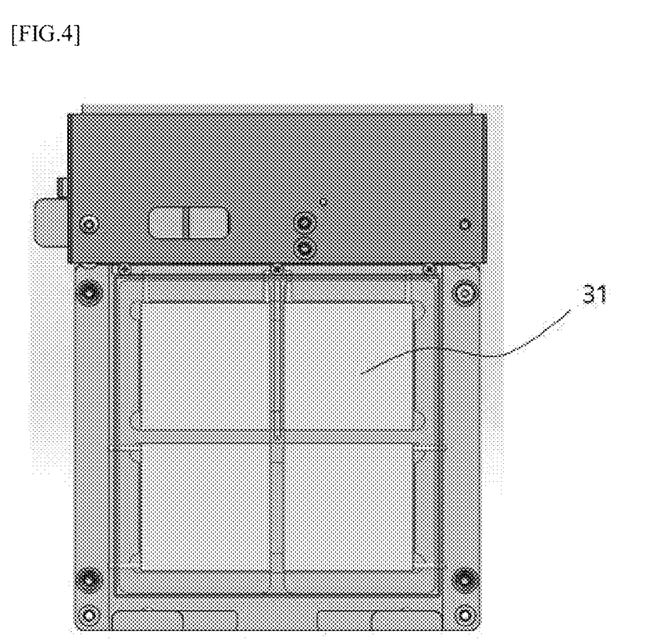
FIG. 4 is a plan view illustrating the arrangement of Peltier elements of FIG. 2.
Figure 5:
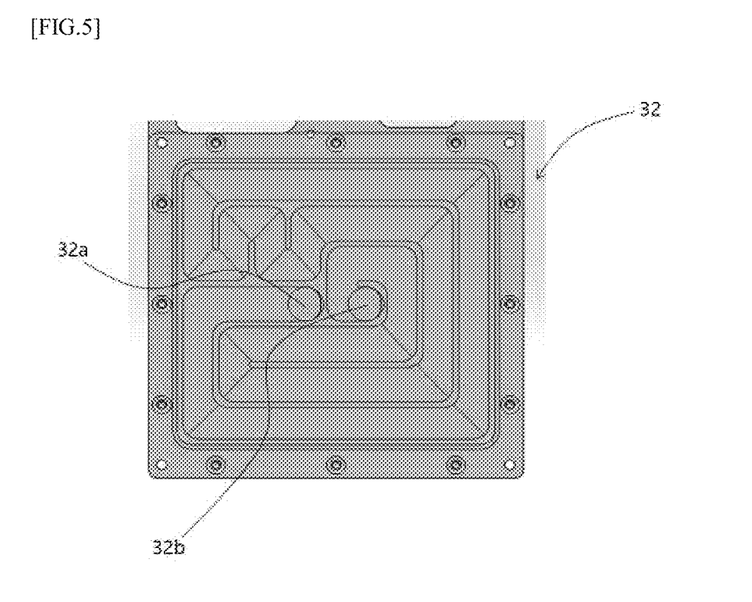
FIG. 5 is a plan view illustrating the arrangement of the water block of FIG. 2.

FIG. 4 is a plan view illustrating the arrangement of Peltier elements of FIG. 2. FIG. 5 is a plan view illustrating the arrangement of the water block of FIG. 2.

Referring to FIGS. 4 and 5, the cooling module 30 includes one or more Peltier elements 31 configured to cool the printing plate module 20, and a water block 32 provided at a heating surface side of the Peltier elements 31 and having a coolant flow path formed therein to circulate a coolant to dissipate heat generated from the Peltier elements 31. A plurality of Peltier elements 31, e.g., four Peltier elements 31, may be arranged in parallel. The Peltier elements 31 are disposed above a Peltier support 32c and supported by the Peltier support 32c. The Peltier support 32c is formed as an upper surface of the water block 32, and a plurality of grooves into which the Peltier elements 31 are fitted are formed in an upper surface of the Peltier support 32c. The Peltier elements 31 are spaced apart from each other, and an area filled with air is formed between the Peltier elements 31.

The water block 32 may be formed of brass and/or aluminum having high thermal conductivity. A thermal grease layer 33 may be formed between an upper surface of the Peltier elements 31 and a lower surface of the cooling bed 23 and between a lower surface of the Peltier elements 31 and the upper surface of the water block 32. The thermal grease layer 33 may be formed of aluminum metal particles, zinc oxide (ZnO) (semiconductor particles), and/or a silicone oil. A water inlet 32a through which a coolant flows in is formed at one side of the coolant flow path of the water block 32, and an outlet 32b through which the coolant flows out is formed at the other side of the coolant flow path of the water block 32. The water inlet 32a and the outlet 32b pass through a connector block 35 coupled to a lower portion of the water block 32 and are connected to a coolant flow tube extending from the coolant providing module 40.

Figure 6:
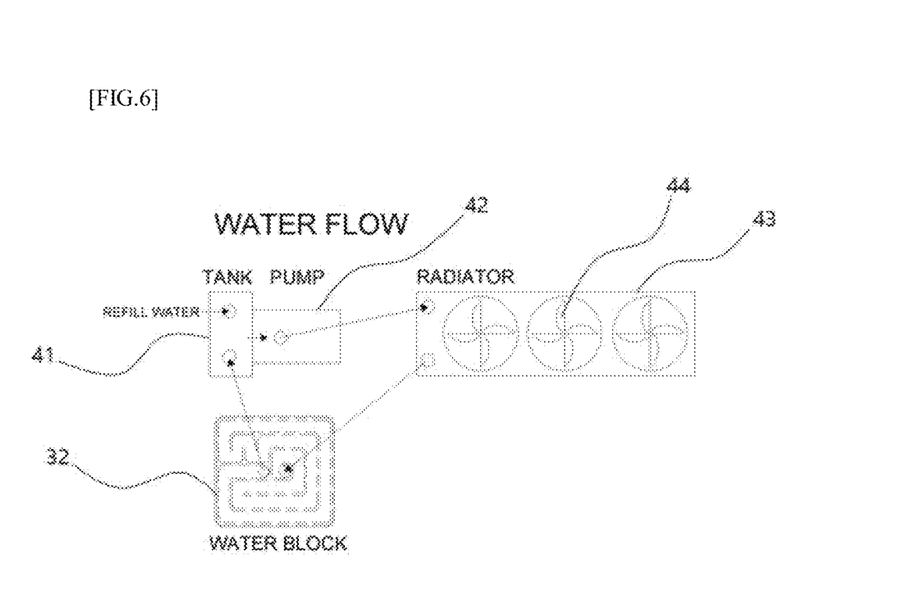
FIG. 6 is a view illustrating a coolant circulation path between the water block and a coolant providing module of FIG. 2.
Figure 7:
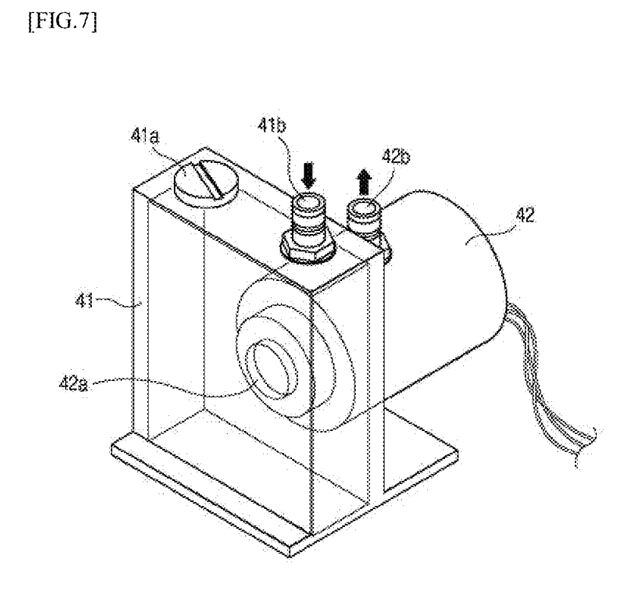
FIG. 7 is a view illustrating a coolant tank and a coolant pump in the coolant providing module of FIG. 2.

FIG. 6 is a view illustrating a coolant circulation path between the water block and a coolant providing module of FIG. 2. FIG. 7 is a view illustrating a coolant tank and a coolant pump in the coolant providing module of FIG. 2.

Referring to FIGS. 6 and 7, the coolant providing module 40 is designed to provide a coolant to the cooling module 30 and includes a coolant tank 41, a coolant pump 42, a radiator 43, and a radiator fan 44.

The coolant tank 41 stores a coolant and receives a circulating coolant from the water block 32. A coolant inlet 41a configured to receive a coolant from the outside and an inlet 41b through which a coolant flows in from the water block 32 are formed in the coolant tank 41. The coolant pump 42 is connected to the coolant tank 41 and provides power to the coolant received from the coolant tank. A connection port 42a connected to the coolant tank 41 and an outlet 42b through which the coolant flows out are formed in the coolant pump 42. The coolant flowing out through the outlet 42b is provided to the radiator 43. The radiator 43 has one side connected to the coolant pump 42 and the other side connected to the water block 32. A coolant circulation flow path is formed in the radiator 43, and the coolant circulates along the coolant circulation flow path in the radiator 43. The radiator fan 44 is disposed adjacent to the radiator 43 to dissipate heat generated from the radiator 43.

Figure 8:
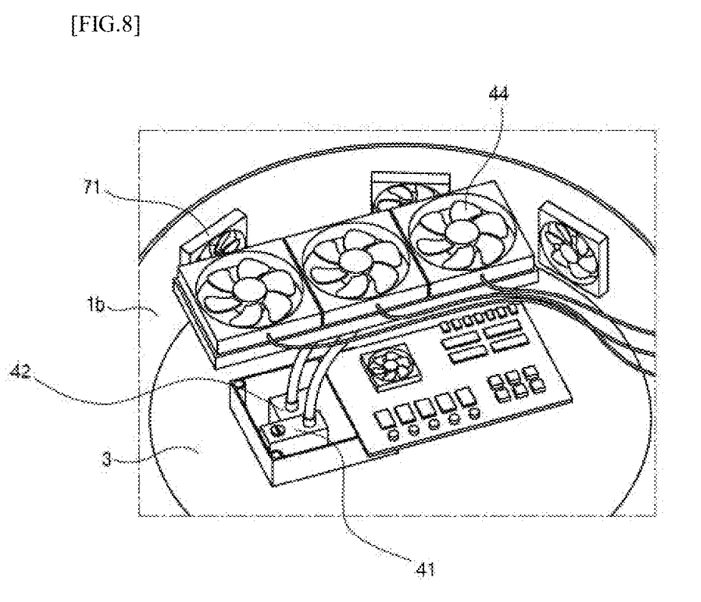
FIG. 8 is a view illustrating a chamber outer space in which a controller and the coolant providing module are disposed in the bio printer of FIG. 1.
Figure 9:
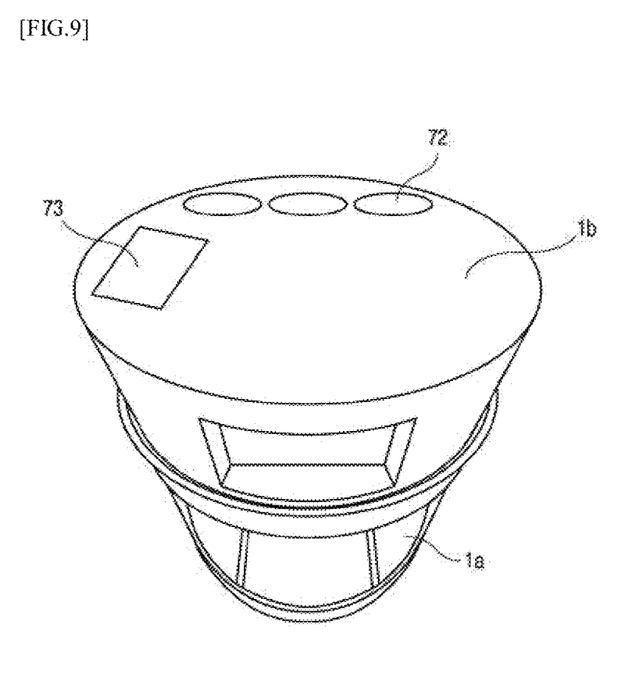
FIG. 9 is a view illustrating an outside air suction port and a coolant refill door installed at the chamber outer space of the bio printer of FIG. 1.

FIG. 8 is a view illustrating a chamber outer space in which a controller and the coolant providing module are disposed in the bio printer of FIG. 1. FIG. 9 is a view illustrating an outside air suction port and a coolant refill door installed at the chamber outer space of the bio printer of FIG. 1.

Referring to FIGS. 8 and 9, the bio printer according to the present disclosure may include a printing chamber 1a having an inner space in which printing is performed, and a chamber outer space 1b separated from the printing chamber 1a by a separation plate 3. The chamber outer space 1b is disposed at an upper side of the printing chamber 1a. The coolant providing module 40, the printing controller 61, and the output hardening controller 62 are disposed in the chamber outer space 1b.

A duct fan 71, an outside air suction port 72, and a coolant refill door 73 may be installed in the chamber outer space 1b. The duct fan 71 discharges heat generated in the chamber outer space 1b to an outside of the bio printer. The duct fan 71 may be installed as a plurality of duct fans 71 on a sidewall of the chamber outer space 1b. The outside air suction port 72 is a passage through which outside air is introduced into the chamber outer space 1b. The coolant refill door 73 is formed to be openable and closeable to supply a coolant to the coolant tank 41 and is formed above the coolant inlet 41a of the coolant tank 41. The outside air suction port 72 and the coolant refill door 73 may be installed at an upper surface of the chamber outer space 1b. The outside air suction port 72 may be provided as a plurality of outside air suction ports 72.

Figure 10:
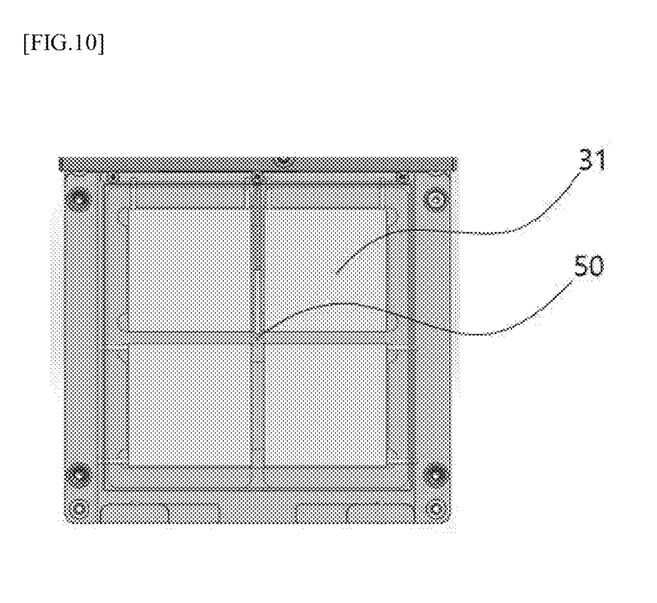
FIG. 10 is a view illustrating Peltier elements of FIG. 3 and a temperature sensor disposed between the Peltier elements.

FIG. 10 is a view illustrating Peltier elements of FIG. 3 and a temperature sensor disposed between the Peltier elements.

Referring to FIG. 10, the temperature sensor 50 is provided in the cooling module 30 to calculate a temperature of the printing surface 20a of the printing plate module 20. For example, the temperature sensor 50 may be disposed between the Peltier elements 31 and may be positioned at the center of the arrangement of the Peltier elements 31. Using a pre-calculated table reflecting a height difference between the temperature sensor 50 and the printing surface 20a, the temperature of the printing surface 20a may be calculated from a value detected by the temperature sensor 50.

The printing controller 61 is configured to control the operation of the dispenser 10 to print the output. The output hardening controller 62 is configured to, upon completion of printing of the output by the printing controller 61, receive a detected value from the temperature sensor 50 and control the cooling module 30 and the coolant providing module 40 to freeze-harden the output. The output is cooled by the Peltier elements 31 so that the output is freeze-hardened. The output hardening controller 62 may control the operation of the Peltier elements 31, the coolant providing module 40, and the duct fan 71. The output hardening controller 62 may control the operation of the Peltier elements 31 so that the temperature of the printing surface 20a reaches a predetermined temperature in a range of −1° C. to −20° C.

A method of freeze-hardening a biomaterial of the bio printer according to the present disclosure is performed as follows by the output hardening controller 62.

First, the output hardening controller 62 operates the coolant pump 42, the radiator fan 44, and the duct fan 71 while operating the Peltier elements 31 (S10). The output hardening controller 62 receives a temperature value detected by the temperature sensor 50 and controls the Peltier elements 31 using a proportional integral derivative (PID) method. The power of the Peltier elements 31 is controlled through a solid state relay (SSR), and a power supply method is controlled by pulse width modulation (PWM). The output hardening controller 62 operates the Peltier elements 31 through real-time PID control. Next, in response to the temperature detected by the temperature sensor 50 reaching the predetermined temperature in the range of −1° C. to −20° C., the output hardening controller 62 turns off the SSR to stop the operation of the Peltier elements 31 (S20). A printing temperature is cooled to the predetermined temperature, and freeze-hardening of the output is completed. In response to the temperature detected by the temperature sensor 50 not reaching the predetermined temperature, the output hardening controller 62 turns on the SSR. Next, after stopping the operation of the Peltier elements 31, the output hardening controller 62 additionally operates the coolant pump 42, the radiator fan 44, and the duct fan 71 for a predetermined amount of time (S30). The predetermined amount of time may be set to about 1 minute. In this way, a failure of the Peltier elements 31 can be prevented.

Figure 11:
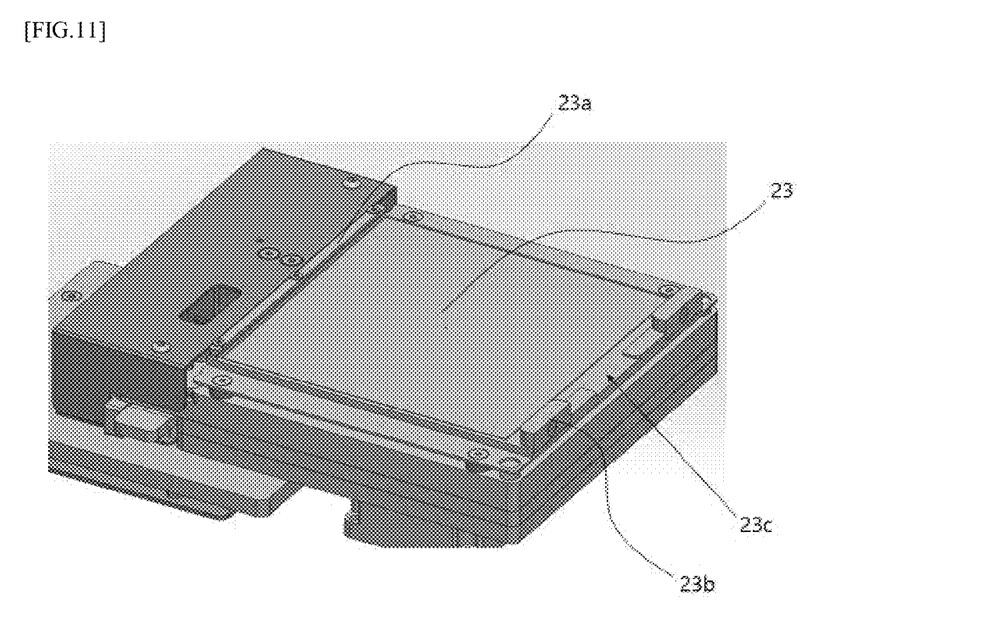
FIG. 11 is a perspective view illustrating a state before a film and a matrix plate of FIG. 2 are coupled to a cooling bed.
Figure 12:
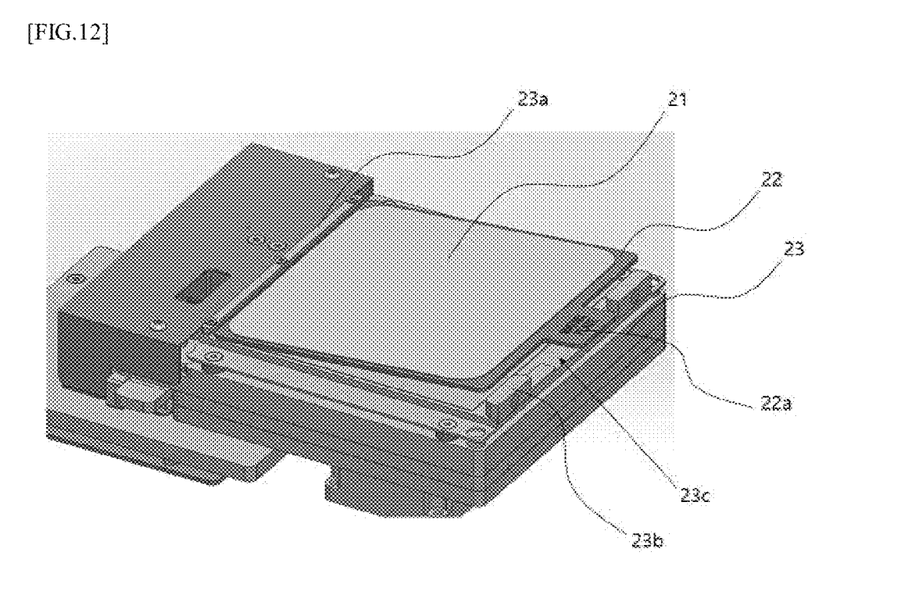
FIG. 12 is a perspective view illustrating a state while a composite body of the film and the matrix plate is being coupled to the cooling bed of FIG. 11.
Figure 13:
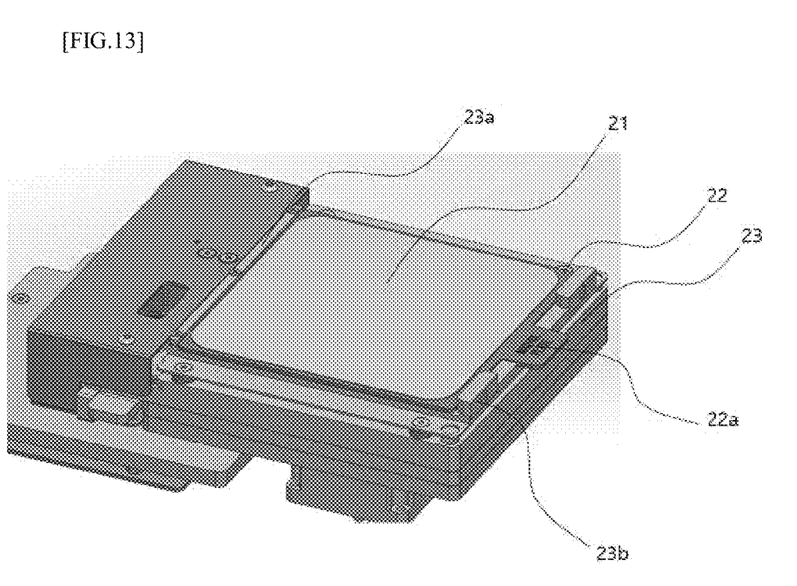
FIG. 13 is a perspective view illustrating a state after the composite body of the film and the matrix plate is coupled to the cooling bed of FIG. 11.

FIG. 11 is a perspective view illustrating a state before a film and a matrix plate of FIG. 2 are coupled to a cooling bed. FIG. 12 is a perspective view illustrating a state while a composite body of the film and the matrix plate is being coupled to the cooling bed of FIG. 11. FIG. 13 is a perspective view illustrating a state after the composite body of the film and the matrix plate is coupled to the cooling bed of FIG. 11.

Referring to FIGS. 11 to 13, a composite body of the film 21 and the matrix plate 22 is coupled onto the cooling bed 23. The film 21 attached to the matrix plate 22 is detachably coupled to the cooling bed 23. A first fixing surface 23a and a second fixing surface 23b which are configured to fix the mounted matrix plate 22 are disposed at positions facing each other on the cooling bed 23. A handle 22a extending to a position spaced apart from the cooling bed 23 is formed at the matrix plate 22. The second fixing surface 23b is formed in a direction toward the door of the printing chamber, and a fitting space 23c into which the handle 22a is fitted is formed on the second fixing surface 23b. In a state in which one side of the matrix plate 22 is inclined while in contact with the first fixing surface 23a, the handle 22a at the other side of the matrix plate 22 is fitted into the fitting space 23c. The other side of the matrix plate 22 comes in contact with the second fixing surface 23b, and the matrix plate 22 is fixed onto the cooling bed 23. After printing and cooling are completed, a worker may hold the handle 22a, lift the other side of the matrix plate 22, and then detach the other side of the matrix plate 22 from the cooling bed 23.

According to the present disclosure, a biomaterial discharged from a fluid biomaterial dispenser, among dispensers of a bio printer, can immediately harden on a printing surface and be applied to a living body while maintaining its form.

The protection scope of the present disclosure is not limited by the description or expressions of the embodiments explicitly described above. Also, it should be noted that changes or substitutions self-evident in the art to which the present disclosure pertains cannot limit the protection scope of the present disclosure.

What is claimed is:

1. A bio printer to which a biomaterial freeze-hardening method is applied, the bio printer comprising:
    a plurality of dispensers configured to discharge a biomaterial inside a printing chamber;
    a printing plate module disposed below the dispensers so that the discharged biomaterial is placed thereon;
    a cooling module including one or more Peltier elements configured to cool the printing plate module, and a water block provided at a heating surface side of the Peltier elements and having a coolant flow path formed therein to circulate a coolant to dissipate heat generated from the Peltier elements;
    a coolant providing module configured to provide the coolant to the cooling module;
    a temperature sensor provided in the cooling module to calculate a temperature of a printing surface of the printing plate module;
    a printing controller configured to control the operation of the dispensers to print an output; and
    an output hardening controller configured to, upon completion of printing of the output by the printing controller, receive a detected value from the temperature sensor and control the cooling module and the coolant providing module to freeze-harden the output.

2. The bio printer of claim 1, wherein the printing plate module includes:
    a cooling bed which is disposed on the Peltier elements and cooled by the Peltier elements; and
    a matrix plate which is detachably mounted on the cooling bed,
    and a biocompatible film having a surface on which the discharged biomaterial is placed is detachably attached to an upper surface of the matrix plate due to viscosity.

3. The bio printer of claim 2, wherein the plurality of dispensers include:
    a first dispenser configured to print a scaffold that defines an outer boundary of the output; and
    a second dispenser configured to print a fluid biomaterial in the scaffold,
    and the scaffold is fusion-fixed to the film as the film partially melts due to the biomaterial printed by the first dispenser, and the fluid biomaterial printed by the second dispenser does not leak through an interface between the scaffold and the film.

4. The bio printer of claim 3, wherein the output formed of the scaffold and the fluid biomaterial and freeze-hardened is a patch implanted in an affected area of skin or an organ of a mammal or a human being.

5. The bio printer of claim 4, wherein the affected area is an affected area where a diabetic foot ulcer or cartilage wear has occurred or a lesion or a traumatic defect has occurred in an organ.

6. The bio printer of claim 2, wherein:
    a first fixing surface and a second fixing surface which are configured to fix the mounted matrix plate are disposed at positions facing each other on the cooling bed; and
    a handle extending to a position spaced apart from the cooling bed is formed at the matrix plate.

7. The bio printer of claim 6, wherein the second fixing surface is formed in a direction toward a door of the printing chamber, and a fitting space into which the handle is fitted is formed at the second fixing surface.

8. The bio printer of claim 2, wherein a thermal grease layer is formed between an upper surface of the Peltier elements and a lower surface of the cooling bed and between a lower surface of the Peltier elements and an upper surface of the water block.

9. The bio printer of claim 1, wherein:
    a Peltier support is formed between the Peltier elements and the water block; and
    a plurality of grooves spaced apart from each other into which the Peltier elements are fitted are formed in an upper surface of the Peltier support.

10. The bio printer of claim 1, wherein the coolant providing module includes:
    a coolant tank configured to store a coolant and receive a circulating coolant from the water block;
    a coolant pump connected to the coolant tank;
    a radiator having one side connected to the coolant pump and the other side connected to the water block and having a coolant circulation flow path formed therein; and
    a radiator fan configured to dissipate heat generated from the radiator.

11. The bio printer of claim 10, wherein a chamber outer space in which the coolant providing module is installed is formed to be separated from an inner space of the printing chamber, and
    the chamber outer space includes:
    at least one duct fan configured to discharge heat generated in the chamber outer space to an outside of the bio printer;
    an outside air suction port through which outside air is introduced into the chamber outer space; and
    a coolant refill door formed to be openable and closeable to allow a coolant to be supplied from the outside to the coolant tank and formed above a coolant inlet of the coolant tank.

12. The bio printer of claim 11, wherein the output hardening controller:
    operates the coolant pump, the radiator fan, and the duct fan while operating the Peltier elements;
    stops the operation of the Peltier elements in response to the output being freeze-hardened due to a temperature of the printing surface being cooled to a predetermined temperature; and
    after stopping the operation of the Peltier elements, additionally operates the coolant pump, the radiator fan, and the duct fan for a predetermined amount of time in order to remove residual heat from the Peltier elements.

13. The bio printer of claim 1, wherein the output hardening controller controls the operation of the Peltier elements so that the temperature of the printing surface reaches a predetermined temperature in a range of −1° C. to −20° C.

14. A method of freeze-hardening a biomaterial of a bio printer including a plurality of dispensers, a printing plate module, a cooling module including a Peltier element, a temperature sensor provided in the cooling module, a coolant providing module including a coolant tank, a coolant pump, a radiator, and a radiator fan, a duct fan configured to discharge heat to the outside, a printing controller, and an output hardening controller, the method comprising:
 (a) an operation of, by the printing controller, discharging a biomaterial in a printing chamber through the plurality of dispensers to form an output;
 (b) an operation of operating the coolant pump, the radiator fan, and the duct fan while operating the Peltier element; and
 (c) an operation of stopping the operation of the Peltier element in response to the output being freeze-hardened due to a temperature of a printing surface of the printing plate module, which is calculated on the basis of a value detected by the temperature sensor, being cooled to a predetermined temperature.

15. The method of claim 14, wherein the plurality of dispensers include a first dispenser and a second dispenser, a biocompatible film is detachably attached to an upper surface of the printing plate module due to viscosity, and step (a) includes:
 (a-1) an operation of, by the first dispenser, printing a scaffold that defines an outer boundary of the output;
 (a-2) an operation of, by the second dispenser, printing a fluid biomaterial in the scaffold; and
 (a-3) an operation of fusion-fixing the scaffold to the film as the film partially melts due to the biomaterial printed by the first dispenser,
 wherein the fluid biomaterial printed by the second dispenser does not leak through an interface between the scaffold and the film.

16. The method of claim 14, further comprising, after step (c), (d) an operation of, after stopping the operation of the Peltier element, additionally operating the coolant pump, the radiator fan, and the duct fan for a predetermined amount of time in order to remove residual heat from the Peltier element.

* * * * *